Patented May 26, 1925.

1,539,775

UNITED STATES PATENT OFFICE.

JOHAN NICOLAAS ADOLF SAUER, OF AMSTERDAM, NETHERLANDS, ASSIGNOR TO NAAM-LOOZE VENNOOTSCHAP NORIT WITSUIKER MAATSCHAPPIJ (ALSO CALLED NORIT WHITE SUGAR COMPANY), OF AMSTERDAM, NETHERLANDS, A CORPORATION OF THE NETHERLANDS.

PROCESS OF PURIFYING AND STERILIZING WATER.

No Drawing. Application filed July 26, 1917. Serial No. 182,882.

*To all whom it may concern:*

Be it known that I, JOHAN NICOLAAS ADOLF SAUER, a subject of the Queen of the Netherlands, and resident of 567 Heerengracht, Amsterdam, Netherlands, have invented certain new and useful Improvements in Processes of Purifying and Sterilizing Water, of which the following is a specification.

My invention relates to a treatment of water by which it is purified and at the same time sterilized (and also filtered in some cases), that is to say, the treatment not only removes impurities of an animal, vegetable, and mineral character, but also frees the water (to some extent at least) from living organisms such as bacteria, fungi, germs, etc. The efficiency of the new treatment devised by me is so great that even very turbid and very highly contaminated water (say, sewage) may be converted readily into absolutely safe drinking water of pure taste.

In order to obtain these results, I subject the impure water to the action of a special neutral sterile decolorizing carbon, of a high grade produced as explained hereinafter.

Decolorizing carbon is a substance derived from vegetable material and consisting largely of carbon in an amorphous and therefore highly absorbent condition. Decolorizing carbon is brought on the market in several species and under different names, for instance, "norit," "eponit" (or "eponite"), and "noir epuré" (see U. S. Patents 1,070,654; 1,074,357; 1,176,999; and 1,189,896).

I take any high-class decolorizing carbon (preferably those known commercially as norit, eponit (or eponite), and noir epure, and referred to in the U. S. patents mentioned above, and treat any such carbon with a suitable acid, say hydrochloric acid or sulfuric acid, but preferably hydrochloric acid, a 2% solution of this latter acid in water being a suitable one. This should be carried out at a high temperature, preferably at the boiling point of the diluted acid solution. This treatment with acid should not be a mere washing, but a thorough treatment continued for one hour or more, and preferably carried out in wooden vats with wooden stirrers, steam being injected into the acid solution. The amount of acid employed should be in some excess of the amount required to remove the objectionable impurities present in the original decolorizing carbon, and particularly the above-mentioned salts, calcium carbonate, magnesium carbonate, calcium phosphate, potassium carbonate, and also iron oxid and iron salts, which together form the major part of the detrimental impurities or ash contents of the present decolorizing carbon.

After the norit (or other decolorizing agent) has been treated as above set forth, it is filtered off in suitable filters or filter presses, or treated in centrifugal separators or in decanting or subsiding tanks, and well washed, with water, preferably hot water, say by pumping hot water through the filters or filter presses containing the decolorizing carbon, or by repeated decanting with the aid of decanting tanks, or by one or more washings in turbines.

In some cases, the treatment of decolorizing carbon with acid should or may be preceded by a preliminary treatment consisting of two steps, the first being treatment with alkalies (preferably caustic soda, or lime), or with strong sulfuric acid or with oxidizing chemicals, e. g. potassium permanganate, sodium or potassium chlorates, sodium or potassium or calcium hypochlorites, or with dehydrating agents (e. g. zinc chloride) or with calcium or magnesium chlorides. The second step consists of a washing operation, preferably with hot water. This preliminary treatment is particularly advisable when the decolorizing carbon contains a relatively large proportion of sulfate of lime, which by boiling say with carbonate of soda is converted into carbonate of lime and sulfate of soda. The following washing with hot water will take away the sulfate of soda, which is soluble. The subsequent treatment with acid, say hydrochloric acid, converts the carbonate of lime into calcium chloride, and the following washing with hot water will remove the calcium chloride. In case the decolorizing carbon contains organic matter not carbonized or incompletely carbonized, treatment with caustic soda (or oxidizing chemicals, or with strong sulfuric acid), followed by hot-water washing, will remove these impurities (the subsequent treatment with acid and wash-water removing the remaining alkalinity, if alkalies were used).

The resulting new product (improved decolorizing carbon) may be used either wet or dry for certain industrial purposes (such as the treatment of sugar liquids), as described in other applications for patents which I am filing simultaneously herewith. The product, if dried, will generally still contain a certain percentage of moisture, which however, is harmless.

The new product differs from the original in three important respects: First, the dry substance contains a much higher percentage of amorphous carbon than the original decolorizing carbon, say from 97 to 99% instead of about 94%. Even a product containing practically 100% of amorphous carbon in the dry substance could be obtained. Second, the new product also has the carbon in more absorbent and efficient form because its pores are more open, being free from choking substances. Third, not only is the ash content reduced correspondingly (say, from 6% to only from 1 to 3%), but this ash consists mainly of insoluble silica (sand) and some other substances which are either absolutely inert or at least not detrimental. More particularly, it will be noted that this perfected or refined decolorizing carbon is absolutely neutral, that is to say, it no longer contains the salts (such as potassium carbonate, magnesium carbonate, and calcium carbonate or phosphate, etc.) which give an alkaline character to the decolorizing carbons employed hitherto, and further, it contains no free acid which might lead to the undesirable production of invert sugar, when this improved agent is used for treating sugar liquids.

The product described above (purified decolorizing carbon), while suitable for certain industrial purposes, as set forth, still lacks one property which it must have for the satisfactory treatment of water, viz: it is not yet sterile. To give it this additional characteristic, the product is burned under exclusion of air, that is to say, it may be subjected to intense heat (say, about 1200° Fahrenheit) in closed retorts; or steam or superheated steam may be caused to act on the neutral decolorizing carbon either directly or indirectly. If the action of steam is direct, the retort containing the decolorizing carbon might be open to the air; if indirect action is employed (in which case a higher temperature can be attained), the retort is preferably closed.

Now, this new product, sterile neutral decolorizing carbon, has the remarkable property of converting water, even of the most impure and offensive character, into perfectly wholesome and agreeable potable water, by a treatment which purifies the water and at the same time sterilizes it. So far as I am aware, this is a result never obtained before my invention, that is to say, separate treatments were required heretofore for purifying water and for sterilizing it, while with my invention, one treatment has both functions or results. As stated at the beginning of this specification, I use the term "sterilizing" to designate the freeing of the water from living organisms such as bacteria, fungi, germs, etc., while when I speak of "purifying," I refer to the removal of (dead) impurities of an animal, vegetable, and mineral character. A "sterile" agent is therefore defined as one which is free from living organisms.

The manner of treating the water with the new material sterile decolorizing carbon may vary. One way consists in adding this carbon (as a powder) to the impure water (say, from .1 to 50 parts of decolorizing carbon to 1000 parts of water, by weight, depending on the degree of impurity or contamination) and then passing the liquid through a filter or filter press. Or, settling with subsequent decanting may be used in some cases, the carbon being added to the impure water as before. Or, after the carbon has been added to the impure water, the treatment and subsequent separation may be carried out with the aid of centrifugal force, in turbines or centrifugal separators having solid or perforated drums, the latter unlined or lined with cloth, wire gauze, or other suitable retaining material. Or, the decolorizing carbon may be put into porous filters of any kind, so as to cover the surface on the side from which the liquid is admitted, and the impure water is then passed through the filters thus prepared. This treatment will yield the best results if the water is heated to the ordinary boiling point (or higher, under pressure), this being preferable to treating the water cold, or at any temperature between the boiling point and the freezing point. Treatment with heating and especially boiling is advisable when the water is very impure, but the water will usually be treated cold when it is not very impure.

It will be obvious that any suitable preparatory treatment (say, filtration) may be given to the impure water before applying my improved process thereto. The worst or coarsest impurities may thus be removed before my process or treatment is employed to effect sterilization and complete or practically complete purification. Such preparatory treatment may reduce the cost of applying my process, but is not strictly necessary.

The neutral sterile decolorizing carbon produced as above set forth, is applicable to other purposes as well, and in a separate application Serial No. 182,883 filed simultaneously herewith, I have explained this matter more fully and claimed several forms of the new product and the process of manufacturing it.

I claim:

1. The herein described process of freeing water from living organisms and at the same time removing therefrom impurities of an animal, vegetable and mineral character which consists in treating the impure water containing undesirable living microscopic organisms with decolorizing carbon containing over 90% of free carbon, free from living organisms and from alkalies, and separating the water thus treated from the said carbon and from the impurities and other matter adhering to, or absorbed by, such carbon.

2. The herein described process of freeing water from living organisms and at the same time removing therefrom impurities of an animal, vegetable, and mineral character which consists in heating the impure water containing impurities of the character specified while in contact with sterilized decolorizing carbon containing over 90% of free carbon, the said decolorizing carbon being in a finely divided state and initially free from living organisms and from alkalies, and separating the water thus treated from the said carbon and from the impurities and other matter adhering to, or absorbed by, such carbon.

3. The herein described process which consists in treating alkaline decolorizing carbon with acid and water, then sterilizing by heat, the decolorizing carbon thus treated, and treating impure water containing living organisms with the sterile decolorizing carbon thus obtained while in a finely divided state, to free such water from living organisms contained therein, and at the same time to remove from it impurities of an animal, vegetable, and mineral character.

4. The herein described process which consists in treating alkaline decolorizing carbon with acid and washing with water, then sterilizing the neutral decolorizing carbon by heat, and treating impure water containing undesirable microscopic living organisms while applying heat, with the sterile treated decolorizing carbon in a finely divided state, to free such water from living organisms and at the same time remove from it impurities of an animal, vegetable, and mineral character.

In testimony whereof I have signed this specification.

JOHAN NICOLAAS ADOLF SAUER.